United States Patent
Ito

(10) Patent No.: US 11,807,723 B2
(45) Date of Patent: Nov. 7, 2023

(54) POLY(BIPHENYL ETHER SULFONE) RESIN AND MOLDED ARTICLE

(71) Applicant: SUMITOMO CHEMICAL COMPANY, LIMITED, Tokyo (JP)

(72) Inventor: Kazuyuki Ito, Tsukuba (JP)

(73) Assignee: SUMITOMO CHEMICAL COMPNAY, LIMITED, Tokyo (JP)

(*) Notice: Subject to any disclaimer, the term of this patent is extended or adjusted under 35 U.S.C. 154(b) by 243 days.

(21) Appl. No.: 17/277,556

(22) PCT Filed: Sep. 20, 2019

(86) PCT No.: PCT/JP2019/036956
§ 371 (c)(1),
(2) Date: Mar. 18, 2021

(87) PCT Pub. No.: WO2020/066888
PCT Pub. Date: Apr. 2, 2020

(65) Prior Publication Data
US 2021/0355282 A1    Nov. 18, 2021

(30) Foreign Application Priority Data
Sep. 26, 2018  (JP) .................... 2018-180561

(51) Int. Cl.
C08G 75/23 (2006.01)
C08L 81/06 (2006.01)

(52) U.S. Cl.
CPC ............. C08G 75/23 (2013.01); C08L 81/06 (2013.01); C08L 2201/08 (2013.01); C08L 2203/30 (2013.01)

(58) Field of Classification Search
CPC ......... C08G 75/23; C08G 2261/3444; C08G 18/3872; C08G 65/4093; C08L 81/06; C08L 2201/08; C08L 2203/30
See application file for complete search history.

(56) References Cited

U.S. PATENT DOCUMENTS
5,212,264 A    5/1993 Hoffmann et al.
2012/0190764 A1    7/2012 Kohinata et al.
(Continued)

FOREIGN PATENT DOCUMENTS
CN    102482412 A    5/2012
EP    0 412 934 A2    2/1991
(Continued)

OTHER PUBLICATIONS

Extended European Search Report issued in corresponding European Patent Application No. 19864177.1-1102, dated May 24, 2022.
(Continued)

Primary Examiner — Shane Fang
(74) Attorney, Agent, or Firm — McDermott Will & Emery LLP

(57) ABSTRACT

A poly(biphenyl ether sulfone) resin substantially comprising a repeating structure of the following formula (1), wherein a polystyrene equivalent mass average molecular weight Mw and a melt viscosity μ at a temperature of 350° C. satisfy formulas (6) and (7),

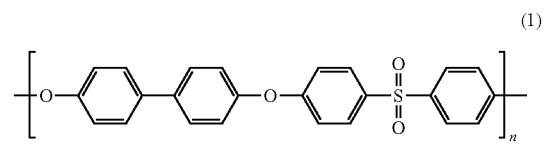

wherein n represents an integer of 1 or more, $60{,}000 \leq Mw \leq 90{,}000$  (6)

$0.0906 \times Mw - 4{,}930 \leq \mu \leq 3{,}500$  (7).

10 Claims, 1 Drawing Sheet

(56) References Cited

U.S. PATENT DOCUMENTS

2015/0065677 A1    3/2015   El-Toufaili et al.
2016/0152776 A1    6/2016   Weber et al.

FOREIGN PATENT DOCUMENTS

| JP | 59-136326 A | 8/1984 |
| JP | 01-318040 A | 12/1989 |
| JP | 2002-525406 A | 8/2002 |
| JP | 2004-107606 A | 4/2004 |
| JP | 2004-263154 A | 9/2004 |
| JP | 2004-285302 A | 10/2004 |
| JP | 2016-524019 A | 8/2016 |
| WO | 00/18824 A1 | 4/2000 |

OTHER PUBLICATIONS

India Office Action issued in corresponding India Patent Application No. 202147012107, dated Jun. 17, 2022.
Japanese Notice of Reasons for Refusal issued in corresponding Japanese Patent Application No. 2020-549119, dated Feb. 14, 2023, with English translation.
International Search Report issued in corresponding International Patent Application No. PCT/JP2019/036956, dated Dec. 24, 2019, with English translation.
Chinese Office Action issued in corresponding Chinese Patent Application No. 201980061944.0, dated Nov. 29, 2022, with English translation.
Office Action issued in corresponding European Patent Application No. 19864177.1, dated Jun. 23, 2023.

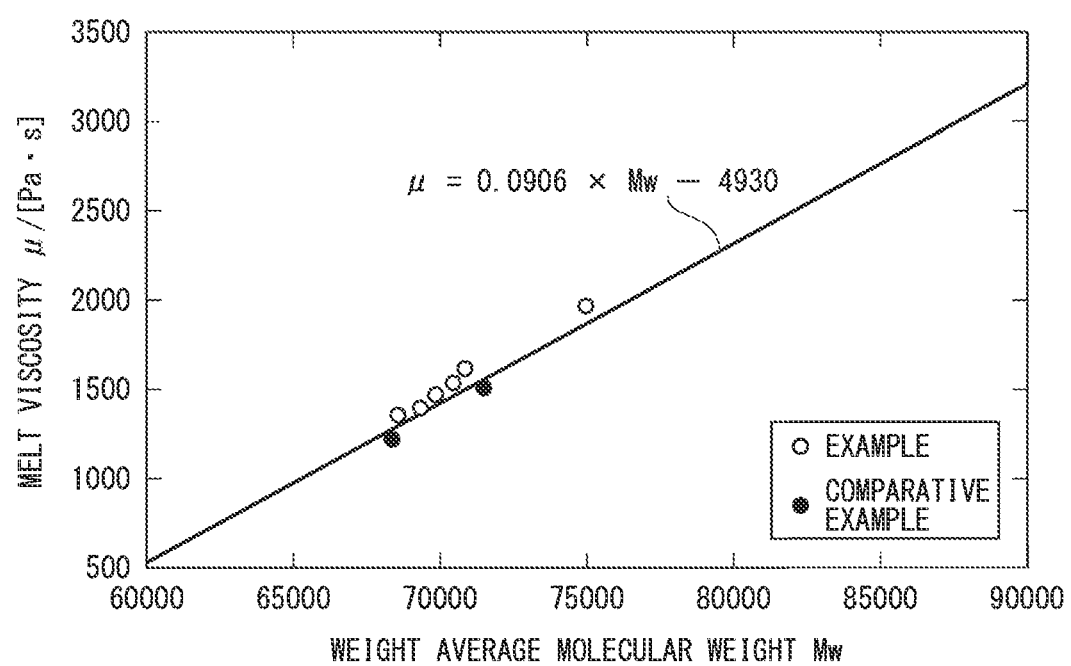

POLY(BIPHENYL ETHER SULFONE) RESIN AND MOLDED ARTICLE

TECHNICAL FIELD

The present invention relates to a poly(biphenyl ether sulfone) resin and a molded article containing the same.

Priority is claimed on Japanese Patent Application No. 2018-180561, filed Sep. 26, 2018, the content of which is incorporated herein by reference.

BACKGROUND ART

A molded article of a poly(biphenyl ether sulfone) resin having a repeating unit represented by the following formula (1-1)

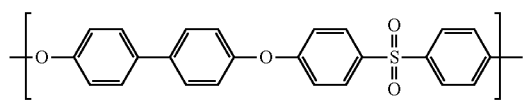

(1-1)

is excellent in heat resistance, impact resistance, solvent resistance and the like. Further, it is also known that, in general, the higher the molecular weight of a poly(biphenyl ether sulfone) resin is, the better the heat resistance and impact resistance of the obtained molded article become.

As a method for producing a poly(biphenyl ether sulfone) resin, for example, methods in which 4,4'-dihydroxybiphenyl and a 4,4'-dihalogenodiphenyl sulfone compound are polymerized in an aprotic polar solvent in the presence of potassium carbonate have been reported in Patent Documents 1 to 3 and the like.

CITATION LIST

Patent Documents

[Patent Document 1] JP 2004-107606 A
[Patent Document 2] JP 2004-263154 A
[Patent Document 3] JP 2002-525406 A

SUMMARY OF THE INVENTION

Problems to be Solved by the Invention

A molded article of a poly(biphenyl ether sulfone) resin excellent in heat resistance, impact resistance, solvent resistance and the like is expected to be applied to applications used in a high temperature atmosphere. However, it has become clear that when a press sheet obtained by press molding a conventional poly(biphenyl ether sulfone) resin is heated to a high temperature of 200° C. and then returned to room temperature, it shrinks from its original size and dimensional changes (hereinafter, may be referred to as "post mold shrinkage") will occur.

An object of the present invention is to provide a poly(biphenyl ether sulfone) resin capable of providing a molded article having little change from the original size, that is, with less post mold shrinkage, even when being thermally annealed and then returned to room temperature; and a molded article with less post mold shrinkage.

Means to Solve the Problems

In order to solve the above problems, the present invention adopts the following configurations.

[1] A poly(biphenyl ether sulfone) resin substantially comprising a repeating structure of the following formula (1), wherein a polystyrene equivalent mass average molecular weight Mw and a melt viscosity μ [Pa·s] at a temperature of 350° C. satisfy the following formulas (6) and (7).

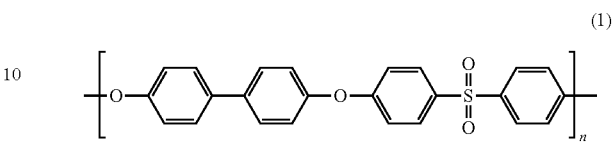

(1)

[In the formula, n represents an integer of 1 or more.]

$$60{,}000 \leq Mw \leq 90{,}000 \quad (6)$$

$$0.0906 \times Mw - 4{,}930 \leq \mu \leq 3{,}500 \quad (7)$$

[2] The poly(biphenyl ether sulfone) resin according to the above [1], wherein the aforementioned mass average molecular weight Mw satisfies the following formula (6-1).

$$65{,}000 \leq Mw \leq 75{,}000 \quad (6\text{-}1)$$

[3] The poly(biphenyl ether sulfone) resin according to the above [1] or [2], wherein the aforementioned mass average molecular weight Mw and the aforementioned melt viscosity μ satisfy the following formula (7-1).

$$0.0906 \times Mw - 4{,}930 \leq \mu \leq 2{,}000 \quad (7\text{-}1)$$

[4] A melt-molded article including the poly(biphenyl ether sulfone) resin according to any one of the above [1] to [3].

Effects of the Invention

A molded article obtained from the poly(biphenyl ether sulfone) resin of the present invention has little change from the original size even when being thermally annealed and then returned to room temperature, that is, there is little post mold shrinkage.

BRIEF DESCRIPTION OF DRAWINGS

The FIGURE is a graph showing a relationship between a melt viscosity μ and a mass average molecular weight Mw.

EMBODIMENTS FOR CARRYING OUT THE INVENTION

Hereinafter, the present invention will be described in detail.

«Poly(Biphenyl Ether Sulfone) Resin»

A poly(biphenyl ether sulfone) resin of the present invention substantially comprises a repeating structure of the following formula (1).

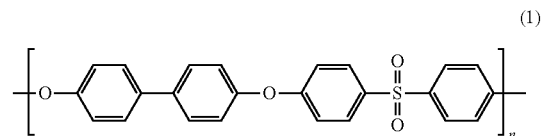

(1)

[In the formula, n represents an integer of 1 or more.]

The poly(biphenyl ether sulfone) resin of the present invention can be represented by, for example, the following formula (1-2), formula (1-3) or formula (1-4). A poly(biphenyl ether sulfone) resin (1-2) represented by the following formula (1-2) and having a halogen atom at the end has a higher thermal decomposition temperature, is less likely to be colored and has a higher thermal stability than a poly (biphenyl ether sulfone) resin (1-3) represented by the following formula (1-3) and having a phenolic hydroxyl group at the end, and a poly(biphenyl ether sulfone) resin (1-4) represented by the following formula (1-4) and having a methoxy group at the end.

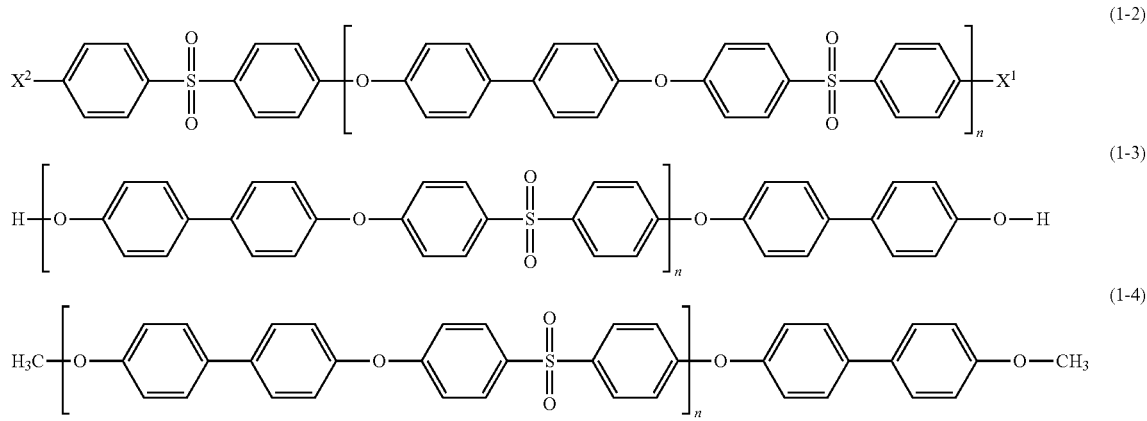

[In the formula, $X^1$ and $X^2$ each independently represent a halogen atom, and n represents an integer of 1 or more.]

In the present specification, the expression "poly(biphenyl ether sulfone) resin substantially comprises a repeating structure of the above formula (1)" means that the mass of the repeating structure of the above formula (1) is 90% by mass or more, more preferably 95% by mass or more, and more specifically, may be 90% by mass or more and 100% by mass or less, and more preferably 95% by mass or more and 100% by mass or less, with respect to the total mass of the poly(biphenyl ether sulfone) resin.

Although n represents an integer of 1 or more, the poly(biphenyl ether sulfone) resin of the present invention may be a mixture containing a compound in which n is an integer of 1 or 2 or more, and n may be an integer of 10,000 or less.

In the poly(biphenyl ether sulfone) resin of the present invention, a polystyrene equivalent mass average molecular weight Mw and a melt viscosity μ [Pa·s] at a temperature of 350° C. satisfy the following formulas (6) and (7).

$$60{,}000 \leq Mw \leq 90{,}000 \tag{6}$$

$$0.0906 \times Mw - 4{,}930 \leq \mu \leq 3{,}500 \tag{7}$$

In the present specification, the melt viscosity μ [Pa·s] can be measured by the method described in the section entitled [Measurement of melt viscosity of poly(biphenyl ether sulfone) resin] described later.

FIG. 1 is a graph showing a relationship between the melt viscosity μ and the mass average molecular weight Mw. The graph of FIG. 1 shows that the mass average molecular weight (Mw) and the melt viscosity μ [Pa·s] of the poly(biphenyl ether sulfone) resin of examples corresponding to the present invention satisfy the formulas (6) and (7).

A value of "0.0906" indicating the slope on the left side of the formula (7) is based on the fact that when the relationship between the mass average molecular weight (Mw) of the poly(biphenyl ether sulfone) resin and the melt viscosity μ [Pa·s] at a temperature of 350° C. is plotted with the mass average molecular weight Mw on the horizontal axis and the melt viscosity μ on the vertical axis, the data from Examples and Comparative Examples described later were found to more or less align on a straight line having a slope value of "0.0906".

The relationship between the polystyrene equivalent mass average molecular weight (Mw) of the poly(biphenyl ether sulfone) resin of the present invention and the melt viscosity μ [Pa·s] at a temperature of 350° C. satisfy the formula of [0.0906×Mw−4,930≤μ]. By satisfying the formula of [0.0906×Mw−4,930≤μ], the molded article obtained from the poly(biphenyl ether sulfone) resin will be one that has little change from the original size, that is, little post mold shrinkage, even when being thermally annealed and then returned to room temperature.

Further, it is shown from the data of Examples and Comparative Examples to be described later that the formula of [μ=0.0906×Mw−4,930] substantially serves as a boundary line distinguishing, among the molded articles containing a poly(biphenyl ether sulfone) resin composed of a repeating structure of the above formula (1), those with less post mold shrinkage and those with more post mold shrinkage.

It is particularly preferable that the poly(biphenyl ether sulfone) resin of the present invention has a polystyrene equivalent mass average molecular weight Mw and a melt viscosity μ [Pa·s] at a temperature of 350° C. satisfying the following formula (7-1).

$$0.0906 \times Mw - 4{,}930 \leq \mu \leq 2{,}000 \tag{7-1}$$

Further, the relationship between the polystyrene equivalent mass average molecular weight (Mw) of the poly (biphenyl ether sulfone) resin of the present invention and the melt viscosity μ [Pa·s] at a temperature of 350° C. may satisfy a formula of [μ≤0.0906×Mw−3,430], a formula of [μ≤0.0906×Mw−3,930], or a formula of [μ≤0.0906×Mw−4,430].

The polydispersity (Mw/Mn) of the poly(biphenyl ether sulfone) resin of the present invention can be set to 1.5 to 8.0, 2.0 to 7.0, 3.0 to 6.0 or 4.5 to 4.8. By ensuring that the polydispersity (Mw/Mn) is equal to or less than the upper limit value, the impact resistance can be further improved.

The polystyrene equivalent mass average molecular weight (Mw) of the poly(biphenyl ether sulfone) resin of the present invention is from 60,000 to 90,000, and can be set to 63,000 to 80,000, 65,000 to 75,000, or 68,500 to 75,000. By ensuring that the mass average molecular weight Mw is equal to or more than the lower limit value, the impact resistance can be further improved, and by ensuring that the mass average molecular weight Mw is equal to or less than the upper limit value, the workability can be further improved.

One aspect of the present invention is a poly(biphenyl ether sulfone) resin having a polystyrene equivalent mass average molecular weight (Mw) of 68,500 to 75,000 and a polydispersity (Mw/Mn) of 4.5 to 4.8.

The melt viscosity μ of the poly(biphenyl ether sulfone) resin of the present invention at a temperature of 350° C. is 3,500 Pa·s or less, preferably 3,000 Pa·s or less, more preferably 2,500 Pa·s or less, and particularly preferably 2,000 Pa·s or less. By ensuring that the melt viscosity μ is equal to or less than the upper limit value, the moldability can be further improved.

The melt viscosity μ of the poly(biphenyl ether sulfone) resin of the present invention at a temperature of 350° C. can be set to 500 Pa·s or more, or 1,300 Pa·s or more.

[In the formula, $X^1$ and $X^2$ each independently represent a halogen atom.]

In the formula (2), examples of the halogen atom represented by $X^1$ and $X^2$ include a fluorine atom, a chlorine atom, and a bromine atom, and examples of the 4,4'-dihalogenodiphenylsulfone compound include 4,4'-difluorodiphenyl sulfone, 4,4'-dichlorodiphenyl sulfone and 4,4'-dibromodiphenyl sulfone.

The 4,4'-dihydroxybiphenyl used in the present invention is a compound represented by the formula (3).

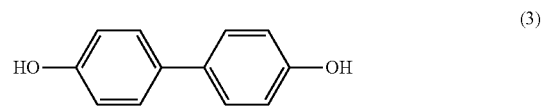

(3)

In one aspect of the present invention, the method for producing a poly(biphenyl ether sulfone) resin represented by the following formula (1-2) can be represented, for example, when an alkali metal carbonate is used, by the following reaction formula (4).

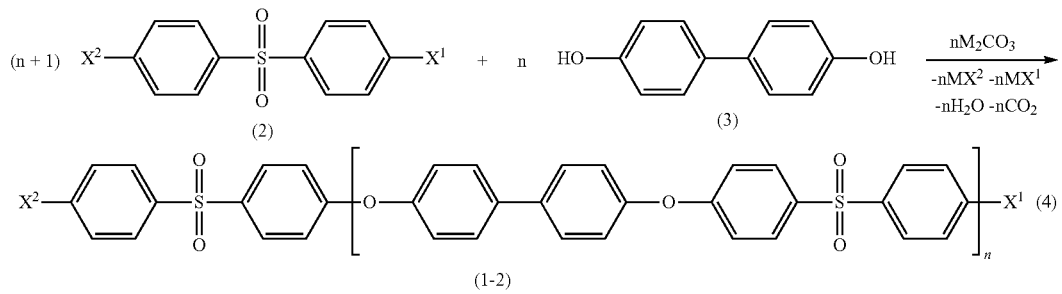

That is, the melt viscosity μ is 500 Pa·s or more and 3,500 Pa·s or less, and preferably 500 Pa·s or more and 3,000 Pa·s or less, 500 Pa·s or more and 2,500 Pa·s or less, 500 Pa·s or more and 2,000 Pa·s or less, 1,300 Pa·s or more and 2,500 Pa·s or less, or 1,300 Pa·s or more and 2,000 Pa·s or less.

The mass average molecular weight (Mw), number average molecular weight (Mn) and polydispersity (Mw/Mn) of the poly(biphenyl ether sulfone) resin are measured on a standard polystyrene basis by gel permeation chromatography (GPC) using a styrene divinylbenzene-based column.

«Method for Producing Poly(Biphenyl Ether Sulfone) Resin»

The poly(biphenyl ether sulfone) resin can be produced by a polycondensation reaction of a 4,4'-dihalogenodiphenyl sulfone compound and 4,4'-dihydroxybiphenyl in an aprotic polar solvent.

The 4,4'-dihalogenodiphenyl sulfone compound used in the method for producing a poly(biphenyl ether sulfone) resin is a compound represented by the following formula (2).

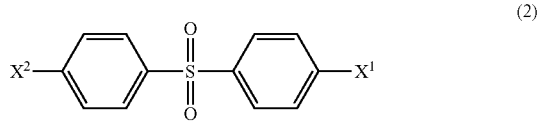

(2)

[In the formula, $X^1$ and $X^2$ are the same as defined above, M represents an alkali metal, and n represents an integer of 1 or more.]

In the method for producing a poly(biphenyl ether sulfone) resin, it is preferable to carry out a polycondensation reaction under a condition in which the mass A of the above poly(biphenyl ether sulfone) resin obtained by the above polycondensation reaction and the mass B of the above aprotic polar solvent satisfy the following formula (5).

$$35 \leq A \times 100 \div (A+B) \leq 44 \quad (5)$$

When the number of moles of the charged 4,4'-dihalogenodiphenyl sulfone compound (2) is equal to or more than the number of moles of the charged 4,4'-dihydroxybiphenyl (3) (for example, when 1 to 1.10 moles, preferably 1.02 to 1.05 moles, of the 4,4'-dihalogenodiphenyl sulfone compound (2) is used with respect to 1 mole of 4,4'-dihydroxybiphenyl (3)), the mass A of the poly(biphenyl ether sulfone) resin (1-2) represented by the above formula (1-2) and obtained by the above polycondensation reaction can be determined as the amount obtained by subtracting the mass of hydrogen halides ($HX^1$, $HX^2$) corresponding to twice the number of moles of the charged mass of the 4,4'-dihydroxybiphenyl (3) from the sum of the charged mass of the 4,4'-dihalogenodiphenyl sulfone compound (2) and the charged mass of the 4,4'-dihydroxybiphenyl (3) in the above reaction formula (4). Here, when the above halogen atoms $X^1$ and $X^2$ are different from each other, the above subtracted mass is the sum of the mass of hydrogen halide ($HX^1$) corresponding to the same number of moles as the charged mass of the 4,4'-dihydroxybiphenyl (3) and the mass of hydrogen halide ($HX^2$) corresponding to the same number of moles as the charged mass of the 4,4'-dihydroxybiphenyl (3).

When the number of moles of the charged 4,4'-dihalogenodiphenyl sulfone compound (2) is less than the number of moles of the charged 4,4'-dihydroxybiphenyl (3) (for example, when 0.90 to 1 mole, preferably 0.95 to 0.98 moles of the 4,4'-dihalogenodiphenyl sulfone compound (2) is used with respect to 1 mole of the 4,4'-dihydroxybiphenyl (3)), a poly(biphenyl ether sulfone) resin (1-3) represented by the above formula (1-3) is obtained by the same polycondensation reaction as in the above reaction formula (4). Furthermore, the poly(biphenyl ether sulfone) resin (1-3) is reacted with methyl halide to obtain a poly(biphenyl ether sulfone) resin (1-4) represented by the above formula (1-4). The calculated mass A of the poly(biphenyl ether sulfone) resin (1-3) represented by the above formula (1-3) and the poly(biphenyl ether sulfone) resin (1-4) represented by the above formula (1-4) obtained by the above polycondensation reaction can be determined as the amount obtained by subtracting the mass of hydrogen halides ($HX^1$, $HX^2$) corresponding to twice the number of moles of the charged mass of the 4,4'-dihalogenodiphenyl sulfone compound (2) from the sum of the charged mass of the 4,4'-dihalogenodiphenyl sulfone compound (2) and the charged mass of the 4,4'-dihydroxybiphenyl (3). Here, when the above halogen atoms $X^1$ and $X^2$ are different from each other, the above subtracted mass is the sum of the mass of hydrogen halide ($HX^1$) corresponding to the same number of moles as the charged mass of the 4,4'-dihalogenodiphenyl sulfone compound (2) and the mass of hydrogen halide ($HX^2$) corresponding to the same number of moles as the charged mass of the 4,4'-dihalogenodiphenyl sulfone compound (2).

In the method for producing a poly(biphenyl ether sulfone) resin, the polymerization concentration defined by the formula: [A×100÷(A+B)] is preferably 35% or more and 44% or less. The poly(biphenyl ether sulfone) resin produced under the conditions satisfying the condition of the formula (5) can satisfy the above formula (7). The polymerization concentration is preferably 43% or less, and more preferably 42% or less. By ensuring that the polymerization concentration is equal to or less than the above upper limit value, the above formula (7) can be satisfied, and it is possible to obtain a poly(biphenyl ether sulfone) resin capable of providing a molded article having little change from the original size, that is, with less post mold shrinkage, even when being thermally annealed and then returned to room temperature. The polymerization concentration is preferably 37% or more, more preferably 39% or more, and particularly preferably 41% or more. By ensuring that the polymerization concentration is equal to or more than the above lower limit value, the polycondensation reaction can be efficiently carried out in a short period of time.

That is, the polymerization concentration may be, for example, 35% or more and 44% or less, 37% or more and 44% or less, 39% or more and 44% or less, 39% or more and 43% or less, 41% or more and 44% or less, 39% or more and 42% or less, 41% or more and 43% or less, or 41% or more and 42% or less.

Although the polycondensation reaction is carried out in an aprotic polar solvent, it is not a homogeneous reaction but a reaction in a slurry state. For this reason, for the structure of the poly(biphenyl ether sulfone) resin as a reaction product between the polymer molecules, when the polymerization concentration defined by the formula: [A×100÷(A+B)] is different, even if the mass average molecular weight Mw and polydispersity Mw/Mn are the same, it is considered that those in which the entanglement of polymer molecules is different are produced. Further, by ensuring that the polymerization concentration is equal to or less than the above upper limit value, it is considered that the above formula (7) can be satisfied, and a poly(biphenyl ether sulfone) resin capable of providing a molded article having little change from the original size, that is, with less post mold shrinkage, even when being used in a high temperature atmosphere and then returned to room temperature can be obtained.

The amount of the 4,4'-dihalogenodiphenyl sulfone compound (2) used is not limited as long as it is adjusted so as to satisfy the above formula (6), but it is usually about 0.90 to 1.10 moles or 0.95 to 1.05 moles, preferably 0.95 to 0.98 moles or 0.96 to 0.98 moles, or 1.02 to 1.05 moles or 1.02 to 1.04 moles, with respect to 1 mole of the 4,4'-dihydroxybiphenyl (3). When it is 0.95 moles or more and 1.05 moles or less, the molecular weight of the obtained poly(biphenyl ether sulfone) resin tends to be high, which is preferable.

In the method for producing a poly(biphenyl ether sulfone) resin, an alkali metal carbonate and/or an alkali metal bicarbonate can be used as a base catalyst. Examples of the alkali metal carbonate include potassium carbonate and sodium carbonate, and examples of the alkali metal bicarbonate include potassium hydrogen carbonate and sodium hydrogen carbonate, and potassium carbonate is usually used.

Further, it is preferable to use an alkali metal carbonate and/or alkali metal bicarbonate powder for the base catalyst.

The amount of the alkali metal carbonate and/or alkali metal bicarbonate used is usually 1 mole or more and 1.2 moles or less, but may be 1.01 moles or more and 1.15 moles or less, or may be 1.02 moles or more and 1.15 moles or less, with respect to 1 mole of the 4,4'-dihydroxybiphenyl (3).

Examples of the aprotic polar solvent used in the present invention include a sulfone-based solvent, an amide-based solvent, a lactone-based solvent, a sulfoxide-based solvent, an organic phosphorus-based solvent and a cellosolve-based solvent. Examples of the sulfone-based solvent include diphenyl sulfone, dimethyl sulfone, diethyl sulfone and sulfolane. Examples of the amide-based solvent include N,N-dimethylacetamide, N-methyl-pyrrolidone, N-methyl-caprolactam, N,N-dimethylformamide, N,N-diethylformamide, N,N-diethylacetamide, N-methylpropionamide and dimethylimidazolidinone. Examples of the lactone-based solvent include γ-butyl lactone and β-butyl lactone. Examples of the sulfoxide-based solvent include dimethyl sulfoxide and methylphenyl sulfoxide. Examples of the organic phosphorus-based solvent include tetramethylphosphoric amide and hexamethylphosphoric amide. Examples of the cellosolve-based solvent include ethyl cellosolve acetate and methyl cellosolve acetate.

As the aprotic polar solvent used in the present invention, a sulfone-based solvent is preferable, and diphenyl sulfone is more preferable.

The temperature of the polycondensation reaction is preferably 180° C. to 300° C., and more preferably 240° C. to 300° C. A temperature of 240° C. or higher is preferable because the reaction rate of polymerization tends to improve, and a temperature of 300° C. or lower is preferable because the molecular weight dispersion of the obtained poly(biphenyl ether sulfone) resin decreases, that is, the molecular weight distribution tends to be more uniform. The time required for the polycondensation reaction is usually about 3 to 20 hours.

The polycondensation reaction proceeds in this manner, but in order to obtain a poly(biphenyl ether sulfone) resin from the reaction mixture after the reaction, for example, the reaction mixture after the reaction may be solidified, powdered, and then washed with a solvent. The reaction mixture after the reaction may be cooled for solidification, and can be solidified by cooling to about room temperature. For making the solidified reaction mixture into a powder, the reaction mixture may be pulverized. As the solvent used for washing, an alkali metal salt such as an alkali metal halide generated by polymerization and a solvent capable of dissolving an aprotic polar solvent without dissolving the poly(biphenyl ether sulfone) resin are used, and, for example, water, an aliphatic ketone such as acetone or methyl ethyl ketone, an aliphatic alcohol such as methanol, ethanol or isopropanol, or a mixed solvent thereof and the like can be used.

«Melt-Molded Article»

A melt-molded article of the present invention comprises the poly(biphenyl ether sulfone) resin of the present invention. A form of the melt-molded article of the present invention may be a powder form, a pellet form, a film or a sheet, a long molded article obtained by extrusion molding, or an injection molded article. For example, the poly(biphenyl ether sulfone) resin can be obtained as a film or a sheet by hot pressing, can be obtained as a long molded article by extrusion molding, can be subjected to T-die molding to mold a film, can be subjected to blow molding to mold a hollow product such as various containers, building materials and sporting goods, and can be obtained as an injection molded article by injection molding. The injection molded article can be produced by injection molding the poly(biphenyl ether sulfone) resin, for example, at a mold temperature of 120 to 180° C. and a resin melting temperature of 330 to 380° C. using a general injection molding machine. In one aspect, since the poly(biphenyl ether sulfone) resin of the present invention is used, the melt-molded article of the present invention can be made to have little change from the original size even when being thermally annealed and then returned to room temperature. In another aspect, since the poly(biphenyl ether sulfone) resin of the present invention is used, the melt-molded article of the present invention can be made to exhibit excellent impact resistance and to have little change in impact resistance before and after thermal annealing, that is, to be less susceptible to thermal aging.

The melt-molded article of the present invention can be made to have an impact resistance, as shown by Izod impact resistance values, of 200 to 2,000 J/m, 400 to 1,500 J/m, 500 to 1,000 J/m or 600 to 800 J/m.

The Izod impact resistance [J/m] of the melt-molded article is measured in accordance with ASTM D256 using a test piece having dimensions of 70 mm in length, 10 mm in width and 1.9 mm in thickness and having a notch with a tip radius of 0.25 mm and a depth of 5 mm in a central portion which is produced by the method described in the section entitled [Impact resistance test] described later.

The test piece may be produced by using a powder obtained by freezing and crushing a melt-molded article with a freeze crusher described later, instead of the "poly (biphenyl ether sulfone) resin" described in the section entitled [Impact resistance test] described later. Freezing and crushing can be carried out by filling a stainless steel container with a sample, for example, under the following conditions.

Freeze crusher: Freezer Mill 6770 manufactured by SPEX SamplePrep, LLC.

Temperature: Liquid nitrogen temperature
Crushing time: 3 minutes

The thermal aging properties of the melt-molded article of the present invention can be evaluated by the Izod impact resistance after thermal annealing by placing in an oven at 180° C. and leaving to stand for 24 hours. For the melt-molded article of the present invention, the Izod impact resistance after thermal annealing can be made substantially the same as the Izod impact resistance before thermal annealing, and the Izod impact resistances before and after thermal annealing can be adjusted to 200 to 2,000 J/m, 400 to 1,500 J/m, 500 to 1,000 J/m, and 600 to 800 J/m, respectively.

One aspect of the melt-molded article of the present invention is that the change in the Izod impact resistance after thermal annealing is in the range of −50% to +50%, preferably −30% to +30%, more preferably −10% to +30%, more preferably −7% to +30%, and still more preferably −7% to +10%, with respect to the Izod impact resistance before thermal annealing.

One aspect of the poly(biphenyl ether sulfone) resin of the present invention is to have a characteristic in which, for a measurement sample (5 mm×20 mm, thickness about 0.2 mm) produced by the method described in the sections entitled [Production of press sheet] and [Measurement of amount of post mold shrinkage] described later, when the amount of post mold shrinkage is measured by the same method, the amount of post mold shrinkage is 17.0 μm or less, preferably 15.0 μm or less, more preferably 13.5 μm or less and still more preferably 13.0 μm or less. The smaller the amount of post mold shrinkage is, the better it is, and it may be 0 μm, but usually it may be 5.0 μm or more.

Another aspect of the poly(biphenyl ether sulfone) resin of the present invention is to have a characteristic capable of producing the above melt-molded article.

Another aspect of the poly(biphenyl ether sulfone) resin of the present invention is to have a characteristic in which when a test piece having dimensions of 70 mm in length, 10 mm in width and 1.9 mm in thickness and having a notch with a tip radius of 0.25 mm and a depth of 5 mm in a central portion is produced by the method described in the section entitled [Impact resistance test] described later and the Izod impact resistance [J/m] is measured in accordance with ASTM D256, it is 200 to 2,000 J/m, preferably 400 to 1,500 J/m, more preferably 500 to 1,000 J/m and still more preferably 600 to 800 J/m.

Another aspect of the poly(biphenyl ether sulfone) resin of the present invention is to have a characteristic in which when the above test piece is further placed in an oven at 180° C. and the Izod impact resistance is measured after thermal annealing by leaving it to stand for 24 hours, the Izod impact resistances before and after thermal annealing are 200 to 2,000 J/m, preferably 400 to 1,500 J/m, more preferably 500 to 1,000 J/m and still more preferably 600 to 800 J/m, respectively.

Yet another aspect of the poly(biphenyl ether sulfone) resin of the present invention is to have a characteristic in which the change in the Izod impact resistance of the above test piece after the thermal annealing is in the range of −50% to +50%, preferably −30% to +30%, more preferably −10% to +30%, more preferably −7% to +30%, and still more preferably −7% to +10%, with respect to the Izod impact resistance before the thermal annealing.

EXAMPLES

Hereinafter, the present invention will be described in more detail with reference to specific examples. However, the present invention is not limited in any way by the examples shown below.

<Measurement of Mn and Mw of Poly(Biphenyl Ether Sulfone) Resin, Calculation of Mw/Mn>

The polystyrene equivalent mass average molecular weight (Mw), number average molecular weight (Mn), and polydispersity (Mw/Mn) of a poly(biphenyl ether sulfone) resin were determined by GPC measurement under the following measurement conditions.

[Measurement Conditions]

Sample: 0.025 g of poly(biphenyl ether sulfone) resin to be measured was added to 10 mL of an N,N-dimethylformamide solution containing 10 mM lithium bromide.

Sample injection volume: 10 μL

Column (stationary phase): Two columns of "TSKgel SuperHZM-M (base material: styrene divinylbenzene)" (4.6 mmφ×150 mm) manufactured by Tosoh Corporation were connected in series.

Column temperature: 40° C.

Eluent (mobile phase): N,N-dimethylformamide containing 10 mM lithium bromide

Eluent flow rate: 0.35 mL/min

Detector: UV detector

Detection wavelength: 300 nm

Molecular weight standard: polystyrene

<Measurement of Melt Viscosity of Poly(Biphenyl Ether Sulfone) Resin>

Using a heat flow evaluation apparatus ("Flowtester Model CFT500" manufactured by Shimadzu Corporation), the melt viscosity μ [Pa·s] was measured when a poly(biphenyl ether sulfone) resin heated at 350° C. for 5 minutes was extruded from a split die (inner diameter: 1 mm, length: 10 mm) under a load of 50 kgf/cm$^2$.

<Production of Press Sheet>

An appropriate amount of poly(biphenyl ether sulfone) resin was placed in a cavity portion of an aluminum spacer having a thickness of about 0.2 mm, and they were sandwiched between a pair of flat aluminum plates. Furthermore, the entirety thereof was sandwiched between a pair of flat steel plates and preheated at 305° C. for 13 minutes in a hot press machine, and was then heated and compressed for 2 minutes at a pressure which was sufficient for fusing the poly(biphenyl ether sulfone) resin to make the thickness the same as that of the aluminum spacer. Then, by cooling with a cooling press machine set at 25° C., a molded article was produced as a press sheet having a thickness of about 0.2 mm.

<Measurement of Amount of Post Mold Shrinkage>

A measurement sample of 5 mm×20 mm was cut out from the press sheet, and the temperature was raised from 30° C. to 200° C. at a rate of 5° C./min (step 1) and then cooled from 200° C. to 30° C. at a rate of 20° C./min (step 2) with a thermomechanical analyzer ("Model TMA-8310" of Rigaku Corporation) in an air atmosphere in a tensile mode (2.5 g). The amount of post mold shrinkage was measured by subtracting the length of the sample at 50° C. in step 1 from the length of the sample at 50° C. in step 2.

<Impact Resistance Test>

A poly(biphenyl ether sulfone) resin to be measured was placed in a cavity portion of an SUS spacer having a thickness of 2 mm and sandwiched between a pair of flat aluminum plates. Furthermore, the entirety thereof was sandwiched between a pair of flat steel plates and preheated at 305° C. for 13 minutes in a hot press machine, and was then heated and compressed for 2 minutes at a pressure which was sufficient for fusing the poly(biphenyl ether sulfone) resin to make the thickness the same as that of the SUS spacer. Then, the resultant was cooled with a cooling press machine set at 25° C. to obtain a plate having a thickness of 1.9 mm. The obtained molded plate was cut into a test piece having dimensions of 70 mm in length, 10 mm in width and 1.9 mm in thickness and having a notch with a tip radius of 0.25 mm and a depth of 5 mm in a central portion, and the Izod impact resistance [J/m] was measured in accordance with ASTM D256.

<Thermal Aging Test>

The test piece was molded, and then placed in an oven at 180° C. and left to stand for 24 hours, and the resultant was used as a test piece after thermal annealing in an impact resistance test. The impact resistance test was conducted in accordance with ASTM D256.

<Production of Poly(Biphenyl Ether Sulfone) Resin>

Example 1

Mixed were 100.0 parts by mass (1 molar ratio) of 4,4'-dihydroxybiphenyl, 159.0 parts by mass (1.031 molar ratio) of 4,4'-dichlorodiphenyl sulfone and 308.9 parts by mass of diphenyl sulfone, in a polymerization vessel equipped with a stirrer, a nitrogen inlet tube, a thermometer, and a condenser attached with a receiver at the tip, and the temperature was raised to 180° C. while causing nitrogen gas to flow into the system. Added was 76.1 parts by mass (1.025 molar ratio) of potassium carbonate to the obtained mixed solution, and then the temperature was gradually raised to 290° C. and the reaction was further carried out at 290° C. for 4 hours. Subsequently, the obtained reaction mixture solution was cooled to room temperature to be solidified, finely pulverized, and then washed several times by decantation and filtration using warm water and a mixed solvent of acetone and methanol. The obtained solid was heated and dried at 150° C. to obtain a poly(biphenyl ether sulfone) resin of Example 1. Table 1 shows the measurement results of the polymerization concentration, mass average molecular weight Mw, polydispersity Mw/Mn, melt viscosity, and amount of post mold shrinkage. Further, Table 2 shows the evaluation results of the impact resistance test and the thermal aging test.

It should be noted that when determining the polymerization concentration in Example 1, the mass A of the poly(biphenyl ether sulfone) resin obtained by the polycondensation reaction was estimated as the amount (219.8 parts by mass) obtained by subtracting the mass of hydrogen halide (2×36.46×0.537) corresponding to twice the number of moles of the charged mass of 4,4'-dihydroxybiphenyl from the sum (259.0 parts by mass) of the charged mass (159.0 parts by mass) of the 4,4'-dihalogenodiphenyl sulfone compound and the charged mass (100.0 parts by mass) of 4,4'-dihydroxybiphenyl. The polymerization concentration was calculated from the formula:

219.8×100÷(219.8+308.9).

In the poly(biphenyl ether sulfone) resin of Example 1, the polystyrene equivalent mass average molecular weight Mw and the melt viscosity μ [Pa·s] at a temperature of 350° C. satisfied the formulas (6) and (7), and the press sheet obtained from the poly(biphenyl ether sulfone) resin had little change from the original size even when being thermally annealed and then returned to room temperature, that is, the amount of post mold shrinkage was small. In addition, the melt-molded article obtained from the poly(biphenyl ether sulfone) resin exhibited excellent impact resistance and had little change in impact resistance before and after thermal annealing, that is, was less susceptible to thermal aging.

Example 2

A poly(biphenyl ether sulfone) resin of Example 2 was obtained under the same conditions as in Example 1 except that the reaction time at 290° C. was 6 hours. Table 1 shows the measurement results of the polymerization concentration, mass average molecular weight Mw, polydispersity Mw/Mn, melt viscosity, and amount of post mold shrinkage.

Example 3

A poly(biphenyl ether sulfone) resin of Example 3 was obtained under the same conditions as in Example 1 except that the amount of diphenyl sulfone was 308.5 parts by mass and the amount of potassium carbonate was 76.5 parts by mass (1.030 molar ratio), and the reaction time at 290° C. was 5 hours. Table 1 shows the measurement results of the polymerization concentration, mass average molecular weight Mw, polydispersity Mw/Mn, melt viscosity, and amount of post mold shrinkage.

Example 4

A poly(biphenyl ether sulfone) resin of Example 4 was obtained under the same conditions as in Example 1 except that the amount of diphenyl sulfone was 308.5 parts by mass and the amount of potassium carbonate was 76.4 parts by mass (1.030 molar ratio), and the reaction time at 290° C. was 4.5 hours. Table 1 shows the measurement results of the polymerization concentration, mass average molecular weight Mw, polydispersity Mw/Mn, melt viscosity, and amount of post mold shrinkage. Further, Table 2 shows the evaluation results of the impact resistance test and the thermal aging test.

Example 5

A poly(biphenyl ether sulfone) resin of Example 5 was obtained under the same conditions as in Example 1 except that the amount of diphenyl sulfone was 307.0 parts by mass and the amount of potassium carbonate was 77.9 parts by mass (1.050 molar ratio). Table 1 shows the measurement results of the polymerization concentration, mass average molecular weight Mw, polydispersity Mw/Mn, melt viscosity, and amount of post mold shrinkage.

Example 6

A poly(biphenyl ether sulfone) resin of Example 6 was obtained under the same conditions as in Example 1 except that the reaction time at 290° C. was 5.8 hours. Table 1 shows the measurement results of the polymerization concentration, mass average molecular weight Mw, polydispersity Mw/Mn, melt viscosity, and amount of post mold shrinkage.

Comparative Example 1

Mixed were 100.0 parts by mass (1 molar ratio) of 4,4'-dihydroxybiphenyl, 159.0 parts by mass (1.031 molar ratio) of 4,4'-dichlorodiphenyl sulfone and 213.4 parts by mass of diphenyl sulfone, in a polymerization vessel equipped with a stirrer, a nitrogen inlet tube, a thermometer, and a condenser attached with a receiver at the tip, and the temperature was raised to 180° C. while causing nitrogen gas to flow into the system. Added was 77.2 parts by mass (1.040 molar ratio) of potassium carbonate to the obtained mixed solution, and then the temperature was gradually raised to 290° C. and the reaction was further carried out at 290° C. for 4 hours. Subsequently, the obtained reaction mixture solution was cooled to room temperature to be solidified, finely pulverized, and then washed several times by decantation and filtration using warm water and a mixed solvent of acetone and methanol. The obtained solid was heated and dried at 150° C. to obtain a poly(biphenyl ether sulfone) resin of Comparative Example 1. Table 1 shows the measurement results of the polymerization concentration, mass average molecular weight Mw, polydispersity Mw/Mn, melt viscosity, and amount of post mold shrinkage. Further, Table 2 shows the evaluation results of the impact resistance test and the thermal aging test.

Comparative Example 2

A poly(biphenyl ether sulfone) resin of Comparative Example 2 was obtained under the same conditions as in Example 1 except that the amount of diphenyl sulfone was 214.1 parts by mass and the amount of potassium carbonate was 76.4 parts by mass (1.030 molar ratio), and the reaction time at 290° C. was 3 hours. Table 1 shows the measurement results of the polymerization concentration, mass average molecular weight Mw, polydispersity Mw/Mn, melt viscosity, and amount of post mold shrinkage. Further, Table 2 shows the evaluation results of the impact resistance test and the thermal aging test.

TABLE 1

| Examples | DCDPS/BP molar ratio | $K_2CO_3$/BP molar ratio | Polymerization concentration [%] | Mw | Mw/Mn | Melt viscosity $\mu$ [Pa·s] | Amount of post mold shrinkage [μm] |
|---|---|---|---|---|---|---|---|
| Ex. 1 | 1.031 | 1.025 | 42 | 69400 | 4.7 | 1397 | −12.7 |
| Ex. 2 | 1.031 | 1.025 | 42 | 70500 | 4.6 | 1534 | −13.0 |
| Ex. 3 | 1.031 | 1.030 | 42 | 69900 | 4.7 | 1464 | −11.7 |
| Ex. 4 | 1.031 | 1.030 | 42 | 70900 | 4.7 | 1619 | −14.6 |
| Ex. 5 | 1.031 | 1.050 | 42 | 75000 | 4.8 | 1963 | −14.6 |
| Ex. 6 | 1.031 | 1.025 | 42 | 68600 | 4.6 | 1350 | −12.5 |
| Comp. Ex. 1 | 1.031 | 1.040 | 51 | 71500 | 4.9 | 1500 | −17.1 |
| Comp. Ex. 2 | 1.031 | 1.030 | 51 | 68400 | 4.7 | 1219 | −37.4 |

DCDPS: 4,4'-dichlorodiphenyl sulfone
BP: 4,4'-dihydroxybiphenyl

TABLE 2

| Examples | Impact resistance test before thermal annealing [J/m] | Impact resistance test after thermal annealing [J/m] |
|---|---|---|
| Ex. 1 | 623 | 796 |
| Ex. 4 | 649 | 614 |
| Comp. Ex. 1 | 519 | 30 |
| Comp. Ex. 2 | 233 | 50 |

The poly(biphenyl ether sulfone) resins of the examples were produced by polycondensation at a constant polymerization concentration of 42%. As shown in FIG. 1, when the horizontal axis represents the mass average molecular weights Mw and the vertical axis represents the melt viscosities μ of the poly(biphenyl ether sulfone) resins of the examples, the plotted points were more or less aligned on a straight line having a slope value of "0.0906". In the poly(biphenyl ether sulfone) resins of the examples, the mass average molecular weights Mw and the melt viscosities μ [Pa·s] satisfied the formulas (6) and (7), and the press sheets obtained from these poly(biphenyl ether sulfone) resins had little change from the original size even when being thermally annealed and then returned to room temperature, that is, the amount of post mold shrinkage was small. In addition, they exhibited excellent impact resistance and had little change in impact resistance before and after thermal annealing, that is, were less susceptible to thermal aging.

The poly(biphenyl ether sulfone) resins of the comparative examples were produced by polycondensation at a constant polymerization concentration of 51%. As shown in FIG. 1, when the horizontal axis represents the mass average molecular weights Mw and the vertical axis represents the melt viscosities μ of the poly(biphenyl ether sulfone) resins of the comparative examples, the plotted points were more or less present on a straight line having a slope value of about "0.0906". In the poly(biphenyl ether sulfone) resins of the comparative examples, the mass average molecular weights Mw and the melt viscosities μ [Pa·s] did not satisfy the formula (7), and the extent of shrinkage from the original size was large in the press sheets obtained from these poly(biphenyl ether sulfone) resins when being thermally annealed and then returned to room temperature, that is, the amount of post mold shrinkage was large. In addition, they exhibited significant reductions in impact resistance when thermal annealing was performed, that is, were susceptible to thermal aging.

It can be understood that the formula of [μ=0.0906×Mw−4,930] substantially serves as a boundary line distinguishing, among the molded articles containing a poly(biphenyl ether sulfone) resin composed of a repeating structure of the above formula (1), those with less post mold shrinkage and those with more post mold shrinkage.

INDUSTRIAL APPLICABILITY

The molded article obtained from the poly(biphenyl ether sulfone) resin of the present invention has little change from the original size even when being used in a high temperature atmosphere and then returned to room temperature, that is, there is little post mold shrinkage. Such molded articles can be expected to be used in a wide range of applications such as electrical/electronic materials, automobile parts, medical materials, heat resistant coating materials, separation membranes, or resin joints, and in particular, precision products used in a high temperature environment.

The invention claimed is:

1. A poly(biphenyl ether sulfone) resin substantially comprising a repeating structure of the following formula (1), wherein a polystyrene equivalent mass average molecular weight Mw and a melt viscosity μ [Pa·s] at a temperature of 350° C. satisfy the following formulas (6) and (7),

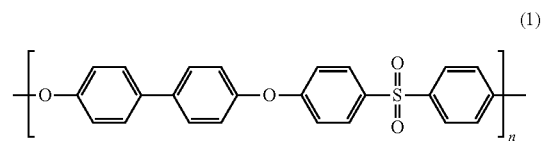

wherein n represents an integer of 1 or more, $$60{,}000 \leq Mw \leq 90{,}000 \tag{6}$$

$$0.0906 \times Mw - 4{,}930 \leq \mu \leq 3{,}500 \tag{7}.$$

2. The poly(biphenyl ether sulfone) resin according to claim 1, wherein said mass average molecular weight Mw satisfies the following formula (6-1):

$$65{,}000 \leq Mw \leq 75{,}000 \tag{6-1}.$$

3. The poly(biphenyl ether sulfone) resin according to claim 1, wherein said mass average molecular weight Mw and said melt viscosity μ satisfy the following formula (7-1):

$$0.0906 \times Mw - 4{,}930 \leq \mu \leq 2{,}000 \tag{7-1}.$$

4. A melt-molded article comprising the poly(biphenyl ether sulfone) resin according to claim 1.

5. The poly(biphenyl ether sulfone) resin according to claim 2, wherein said mass average molecular weight Mw and said melt viscosity μ satisfy the following formula (7-1):

$$0.0906 \times Mw - 4{,}930 \leq \mu \leq 2{,}000 \tag{7-1}.$$

6. A melt-molded article comprising the poly(biphenyl ether sulfone) resin according to claim 2.

7. A melt-molded article comprising the poly(biphenyl ether sulfone) resin according to claim 3.

8. A melt-molded article comprising the poly(biphenyl ether sulfone) resin according to claim 5.

9. The poly(biphenyl ether sulfone) resin according to claim 1, wherein said mass average molecular weight Mw satisfies the following formula (6-2):

$$68{,}500 \leq Mw \leq 75{,}000 \tag{6-2}.$$

10. The poly(biphenyl ether sulfone) resin according to claim 3, wherein said mass average molecular weight Mw satisfies the following formula (6-2):

$$68{,}500 \leq Mw \leq 75{,}000 \tag{6-2}.$$

* * * * *